(12) United States Patent
Sekine

(10) Patent No.: US 8,976,464 B2
(45) Date of Patent: Mar. 10, 2015

(54) IMAGING LENS

(71) Applicant: Kantatsu Co., Ltd., Yaita-shi, Tochigi (JP)

(72) Inventor: Yukio Sekine, Sukagawa (JP)

(73) Assignee: Kantatsu Co., Ltd., Tochigi (JP)

( * ) Notice: Subject to any disclaimer, the term of this patent is extended or adjusted under 35 U.S.C. 154(b) by 0 days.

(21) Appl. No.: 14/071,042

(22) Filed: Nov. 4, 2013

(65) Prior Publication Data

US 2014/0198397 A1    Jul. 17, 2014

(30) Foreign Application Priority Data

Jan. 11, 2013    (JP) ................................. 2013-003924

(51) Int. Cl.
*G02B 13/00*    (2006.01)
*H04N 5/225*    (2006.01)
*G02B 13/18*    (2006.01)

(52) U.S. Cl.
CPC .............. *G02B 13/004* (2013.01); *H04N 5/225* (2013.01); *G02B 13/18* (2013.01)
USPC ............................ 359/715; 348/345; 359/773

(58) Field of Classification Search
CPC .... G02B 13/002; G02B 13/004; G02B 13/18; H04N 5/225

USPC ................................... 348/345; 359/715, 773
See application file for complete search history.

(56) References Cited

U.S. PATENT DOCUMENTS

| | | | | |
|---|---|---|---|---|
| 7,477,459 B2 * | 1/2009 | Liao | ............................... | 359/773 |
| 7,965,455 B2 * | 6/2011 | Okano | ............................ | 359/773 |
| 8,498,064 B2 * | 7/2013 | Okano | ............................ | 359/773 |
| 8,520,321 B2 * | 8/2013 | Takei | .............................. | 359/715 |
| 8,576,499 B2 * | 11/2013 | Okano | ............................ | 359/715 |

FOREIGN PATENT DOCUMENTS

| | | |
|---|---|---|
| JP | 2008-46526 A | 2/2008 |
| JP | 2008-242180 A | 10/2008 |
| JP | 2009-14899 A | 1/2009 |

* cited by examiner

*Primary Examiner* — David N Spector
(74) *Attorney, Agent, or Firm* — Westerman, Hattori, Daniels & Adrian, LLP

(57) ABSTRACT

An imaging lens comprising, in order from the object side: an aperture stop; a positive first lens having convex object-side and image-side surfaces; a double-sided aspheric negative second lens having a concave object-side surface; a meniscus double-sided aspheric positive third lens having a convex image-side surface; and a meniscus double-sided aspheric negative fourth lens having a concave image-side surface. All of the lenses are made of a plastic material.

7 Claims, 14 Drawing Sheets

IMAGING LENS

The present application is based on and claims priority of Japanese patent application No. 2013-003924 filed on Jan. 11, 2013, the entire contents of which are hereby incorporated by reference.

BACKGROUND OF THE INVENTION

1. Field of the Invention

The present invention relates to imaging lenses which form an image of an object on a solid-state image sensor such as a CCD sensor or C-MOS sensor used in a compact image pickup device and more particularly to imaging lenses which are built in image pickup devices mounted in mobile terminals such as smart phones, mobile phones and PDAs (Personal Digital Assistants), which are becoming increasingly compact and thin, and game consoles and information terminals such as PCs.

2. Description of the Related Art

In recent years, the market of mobile terminals including smart phones has been ever-expanding and cameras which cope with an increase in the number of pixels are in the mainstream of cameras built in mobile terminals. Imaging lenses for such cameras are strongly expected to provide higher resolution and be smaller and thinner and also to constitute a high-brightness lens system to cope with an increase in the number of pixels and provide a wide angle of view to capture an image of an object in a wide perspective.

As imaging lenses which meet the trend toward higher performance, many types of imaging lens composed of four lenses (four-element lenses) which can be relatively compact and provide high performance have been proposed.

For example, JP-A-2008-046526 (Patent Document 1) discloses an imaging lens which includes, in order from an object side, an aperture stop, a first lens with positive refractive power, a second lens with negative refractive power, a third lens with positive refractive power, and a fourth lens with negative refractive power having at least one aspheric surface and having a concave object-side surface, in which the power of the first lens and the relation between the curvature radii of the object-side and image-side surfaces of the fourth lens are designed to fail within adequate ranges in order to achieve high performance.

Also, JP-A2008-242180 (Patent Document 2) discloses an imaging lens which includes, in order from an object side, an aperture stop, a first lens with positive refractive power, a second lens with negative refractive power, a third lens with positive refractive power, and a biconcave fourth lens with negative refractive power having at least one aspheric surface, in which the ratios of the focal length of the overall optical system to the focal lengths of the first and third lenses are designed to fall within adequate ranges in order to achieve high performance.

Also, JP-A-2009-014899 (Patent Document 3) discloses an imaging lens which includes, in order from an object side, an aperture stop, a biconvex first lens with positive refractive power, a meniscus second lens with negative refractive power having a convex object-side surface, a meniscus third lens with positive refractive power having a convex image-side surface, and a meniscus fourth lens with negative refractive power having a convex object-side surface, in which the relation between the center thickness of the first lens and the focal length of the first lens and the Abbe numbers of the second and third lenses are designed to fall within adequate ranges in order to achieve high performance.

The imaging lenses described in Patent Document 1 and Patent Document 2 are relatively compact. However, since their F-values are about 3.0, they are not considered to provide sufficient brightness for image sensors which deal with an increasing number of pixels. In addition, the half angle of view is about 30 degrees, which is not enough to meet the demand for wider angles of view. The imaging lens described in Patent Document 3 is relatively compact but its P-value of about 3.2 is not considered to provide sufficient brightness. In addition, its ability to correct spherical aberrations and off-axial aberrations is not sufficient. Therefore, it is difficult for these related art techniques to meet the needs for compactness, wider view angle and small F-value at the same time.

SUMMARY OF THE INVENTION

The present invention has been made in view of the above problem and an object thereof is to provide an imaging lens which meats the needs for compactness and thinness, corrects various aberrations properly with a small F-value and provides a relatively wide angle of view at low cost.

Here, "small F-value" means F 2.6 or less, "compactness" and "thinness" mean that the total track length is shorter than the diagonal length of the effective image plane of an image sensor; and "wide angle of view" means that the full angle of view is in the range of 70 to 80 degrees.

According to one aspect of the present invention, there is provided a fixed-focus imaging lens which forms an image of an object on a solid-state image sensor, in which elements are arranged in the following order from an object side to an image side: an aperture stop; a first lens with positive refractive power having convex surfaces on the object side and the image side; a second lens as a double-sided aspheric lens with negative refractive power having a concave surface on the object side near an optical axis; a third lens as a meniscus double-sided aspheric lens with positive refractive power having a convex surface on the image side near the optical axis; and a fourth lens as a meniscus double-sided aspheric lens with negative refractive power having a concave surface on the image side near the optical axis. All the lenses are made of plastic material and conditional expressions (1), (2), (3), and (4) below are satisfied;

$$0.56 < r1/f < 1.10 \tag{1}$$

$$0.86 < f1/f3 < 1.41 \tag{2}$$

$$-5.0 < r3/r4 < 0.1 \tag{3}$$

$$2.0 < r7/r8 < 4.8 \tag{4}$$

where f: focal length of the overall optical system, of the imaging lens f1: focal length of the first lens f3: focal length of the third lens r1: curvature radius of the object-side surface of the first lens r3: curvature radius of the object-side surface of the second lens r4: curvature radius of the image-side surface of the second lens r7: curvature radius of the object-side surface of the fourth lens r8: curvature radius of the image-side surface of the fourth lens The above imaging lens is a so-called telephoto lens in which positive, negative, positive, and negative (refractive power) constituent lenses are arranged in order from the object side, so that it is easy to shorten the total track length. In the imaging lens, the required refractive power is adequately distributed to the constituent lenses and adequate aspheric surfaces are formed to shorten the total track length and correct various aberrations.

The first lens is a biconvex lens in which the lens surface curvature is lessened to prevent a rise in manufacturing error sensitivity by appropriately distributing the positive refractive power to both convex surfaces.

Also both surfaces of the first lens may be aspheric and in that case, spherical aberrations can be corrected by the first lens and thus the burden of aberration correction on the second lens can be reduced.

The second lens corrects chromatic aberrations which occur on the first lens and when both its surfaces have adequate aspheric shapes, it effectively suppresses paraxial spherical aberrations and off-axial astigmatism and coma aberrations.

The second lens is a biconcave lens having a concave object-side surface and a concave image-side surface near the optical axis or a meniscus lens having a concave object-side surface and a convex image-side surface near the optical axis. If the peripheral portions of the object-side and image-side surfaces of the second lens have aspheric shapes curved toward the object, the total track length can be further shortened and a wider angle of view can be achieved.

Both the surfaces of each of the third lens and fourth lens have adequate aspheric shapes so that correction of off-axial astigmatism, reduction of astigmatic difference and correction of distortion are easy and control of the angle of a chief ray incident on the image sensor (hereinafter referred to as CRA: Chief Ray Angle) is also easy.

The aperture stop is located between the intersection of the first lens object-side surface with the optical axis and the periphery of the first lens object-side surface. Since the aperture stop is close to the object in the lens system, the exit pupil can be distant from the image plane, so that the CRA is easily made nearly perpendicular. The CRA must be controlled in accordance with the specification of the image sensor. Therefore the fourth lens has an adequate aspheric shape so that the CRA is controlled easily. Specifically, the peripheral portion of the fourth lens has an aspheric shape curved toward the object to ensure that the CPA is controlled properly. If the peripheral portion of the fourth lens has a sharply curved aspheric shape, the positive power of the peripheral portion would increase, enabling the CRA to be sore nearly perpendicular. However, in that case, inner reflected light generated in the peripheral portion of the fourth lens image-side surface would easily impinge on the inner surface of the fourth lens object-side surface at an angle which induces total reflection. If totally reflected light reaches the image plane, a ghost phenomenon may occur, causing image quality deterioration. As mentioned above, in the present invention, the aperture stop is located in a position nearest to the object in the lens system and the exit pupil is distant from the image plans and thus originally the CRA is nearly perpendicular, so the burden of CRA control on the aspheric peripheral portion of the fourth lens is reduced and the occurrence of a ghost phenomenon is suppressed. If the aperture stop is in a position nearer to the object with an air distance from the first lens, better CRA control might be done, but from the viewpoint of the lens unit, the lens barrel which houses the aperture stop would be located nearer to the object than the first lens, making it difficult to achieve compactness.

The conditional expression (1) defines an adequate range for the curvature radius of the first lens object-side surface with respect to the focal length of the overall optical system of the imaging lens. If the value in the conditional expression (1) is below the lower limit, the positive power of the first lens would be too strong, making correction of various aberrations difficult. On the other hand, if it is above the upper limit, the positive power of the first lens would be too weak, making it difficult to shorten the total track length and correct axial chromatic aberrations, spherical aberrations and coma aberrations in the lens peripheral portion.

The conditional expression (2) defines an adequate range for the relation between the positive refractive power of the first lens and the positive refractive power of the third lens. If the value in the conditional expression (2) is below the lower limit, the power of the third lens would be too weak as compared with that of the first lens, making it difficult for the third lens to correct field curvature properly. On the other hand, if it is above the upper limit, the power of the third lens would be too strong as compared with that of the first lens, causing chromatic aberrations of magnification to increase.

The conditional expression (3) defines an adequate range for the surface shape of the second lens. If the value in the conditional expression (3) is below the lower limit and the negative power of the second lens is too strong, or if the value is above the upper limit and the negative power of the second lens is too weak, the power balance with the first lens would be disrupted, making it difficult to correct spherical aberrations, axial chromatic aberrations and chromatic aberrations of magnification.

A more preferable form of the conditional expression (3) is a conditional expression (3a) below:

$$-4.0 < r3/r4 < 0.05 \quad (3a)$$

The conditional expression (4) defines an adequate range for the surface shape of the fourth lens and indicates a condition to suppress distortion. If the value in the conditional expression (4) is below the lower limit, distortion would tend to worsen and result in pincushion distortion and if it is above the upper limit, distortion would tend to worsen and result in barrel distortion. If the conditional expression (4) is satisfied, an image with least distortion can be obtained.

A more preferable form, of the conditional expression (4) is a conditional expression (4a) below;

$$2.0 < r7/r8 < 4.5 \quad (4a)$$

Generally, in an attempt to obtain a lens system suitable for a small F-value, there is a tendency that off-axial aberrations are hard to correct because the amount of the flux of light entering the lens increases. However, if the above conditional expressions (1) to (4) for the lens configuration are all satisfied and each lens surface has an optimal aspheric shape, an imaging lens can correct various aberrations properly even though the F-value is small.

Preferably the imaging leas according to the present invention satisfies a conditional expression (5) below:

$$-1.5 < r1/r2 < -0.4 \quad (5)$$

where r1: curvature radius of the object-side surface of the first lens r2: curvature radius of the image-side surface of the first lens The conditional expression (5) defines an adequate range for the surface shape of the first lens. If the value in the conditional expression (5) is below the lower limit, it would be harder to shorten the total track length and various aberrations would worsen. On the other hand, if the value is above the upper limit, it would be easier to achieve compactness but manufacturing error sensitivity of the first lens object-side surface would be higher and various aberrations would tend to worsen.

A more preferable form of the conditional expression (5) is a conditional expression (5a) below:

$$-1.20 < r1/r2 < -0.45 \quad (5a)$$

Preferably the imaging lens according to the present invention satisfies a conditional expression (6) below:

$$1.66 < r5/r6 < 3.20 \quad (6)$$

where r5: curvature radius of the object-side surface of the third lens r6: curvature radius of the image-side surface of the third lens The conditional expression (6) defines an adequate range for the surface shape of the third lens. If the value in the conditional expression (6) is below the lower limit, the positive power of the third lens would be weak and it would be difficult to correct spherical aberrations and chromatic aberrations in the lens peripheral portion. On the other hand, if the value is above the upper limit, the power of the third lens would be too weak and it would be hard to shorten the total track length. Furthermore, if the value in the conditional expression (6) is below the lower limit or above the upper limit, it would be difficult to correct distortion in 30% to 80% of the image height.

A more preferable form of the conditional expression (6) is a conditional expression (6a) below:

$$1.80 < r5/r6 < 2.90 \quad (6a)$$

Preferably the imaging lens according to the present invention satisfies conditional expressions (7), (8), (9), and (10) below:

$$1.50 < Nd1 < 1.59 \quad (7)$$

$$55.0 < vd1 < 57.0 \quad (8)$$

$$1.60 < Nd2 < 1.67 \quad (9)$$

$$23.0 < vd2 < 26.0 \quad (10)$$

where

Nd1: refractive index of the first lens at d-ray vd1: Abbe number of the first lens at d-dray Nd2: refractive index of the second lens at d-ray vd2: Abbe number of the second lens at d-dray The conditional expressions (7) and (8) define adequate ranges for the refractive index and Abbe number of the first lens and the conditional expressions (9) and (10) define adequate ranges for the refractive index and Abbe number of the second lens. These conditional expressions indicate conditions to correct axial chromatic aberrations and chromatic aberrations of magnification properly and reduce cost. When the conditional expressions (7) to (10) for the first lens and the second lens are satisfied, chromatic aberrations can be corrected properly and inexpensive plastic materials can be used.

In addition, when conditional expressions (11) and (12) for the relations in refractive index and Abbe number between the first lens and the second lens below are satisfied, chromatic aberrations can be corrected more properly:

$$1.00 < Nd2/Nd1 < 1.10 \quad (11)$$

$$2.1 < vd1/vd2 < 2.5 \quad (12)$$

Preferably the imaging lens according to the present invention satisfies a conditions expression (13) below:

$$0.36 < f12/f34 < 2.47 \quad (13)$$

where f12: composite focal length of the first and second lenses f34: composite focal length of the third and fourth lenses The conditional expression (13) defines an adequate range for the ratio of the composite focal length of the first and second lenses to the composite focal length of the third and fourth lenses. The first and second lenses largely contribute to correction of aberrations in the imaging lens such as spherical aberrations and chromatic aberrations. When the ratio of the composite focal length of these two lenses to the composite focal length of the third and fourth lenses is so adjusted as to fall within the adequate range, it is easy to correct various aberrations, reduce, manufacturing error sensitivity and shorten the total track length. If the value in the conditional expression (13) is below the lower limit, the composite focal length of the first and second lenses would be too short as compared with the composite focal length of the third and fourth lenses and aberrations which occur on the first and second lenses would tend to increase and the third and fourth lenses would be unable to correct such aberrations. On the other hand, if the value is above the upper limit, the composite focal length of the first and second lenses would be too long and it would be difficult to shorten the total track length. When the ratio is within the range defined, by the conditional expression (13), the total track length is shortened and optical performance is improved.

Preferably the imaging lens according to the present invention satisfies a conditional expression (14) below:

$$1.80 < f/EPD < 2.60 \quad (14)$$

where

EPD: exit pupil diameter

The conditional expression (14) defines an adequate range for the F-value of the imaging lens and indicates a condition to cope with recent high density image sensors. When the pixel size is smaller, the quantity of light which an image sensor takes in tends to be smaller and it is thus more difficult to obtain a bright image. If the image sensor sensitivity is increased, to address this problem, the image quality would be likely to deteriorate due to noise, etc. Therefore, it is effective to increase the quantity of light emitted from the imaging lens. When the conditional expression (14) is satisfied, a bright lens system can be obtained.

A more preferable form of the conditional expression (14) is a conditional expression (14a) below:

$$2.0 < f/EPD < 2.4 \quad (14a)$$

DETAILED DESCRIPTION OF THE PREFERRED EMBODIMENTS

Next, the preferred embodiments of the present invention will be described in detail referring to the accompanying drawings. FIGS. 1, 3, 5, 7, 9, 11, and 13 are schematic views showing the general configurations of the imaging lenses according to Embodiments 1 to 7 of the present invention respectively. Since all these embodiments have the same basic lens configuration, a general explanation of an imaging lens according to any of the preferred embodiments of the present invention is given below mainly referring to the schematic view of Embodiment 1.

Figure 1:
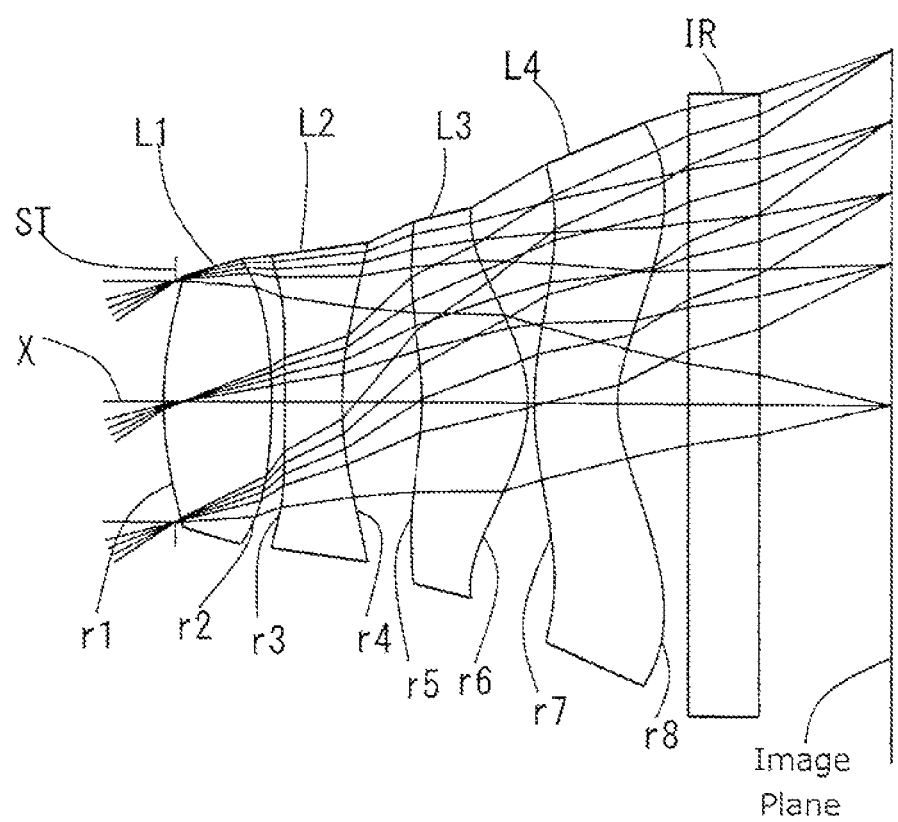
FIG. 1 is a schematic view showing the general configuration of an imaging lens according to Embodiment 1 of the invention.

As shown in FIG. 1, in the imaging lens according to Embodiment 1, elements are arranged in the following order from the object side to the image side: an aperture stop ST, a first lens L1 with positive refractive power having convex surfaces on the object side and image side, a second lens L2 as a double-sided aspheric lens with negative refractive power having a concave surface on the object side near the optical axis X, a third lens L3 as a double-sided aspheric meniscus with positive refractive power having a convex surface on the image side near the optical axis X, and a fourth lens L4 as a double-sided aspheric meniscus lens with negative refractive power having a concave surface on the image side near the optical axis X. This refractive power arrangement may be virtually that of a telephoto lens, which implies that it is easy to shorten the total track length. In addition, the first lens L1, the third lens L3, and the fourth lens L4 are made of a low-dispersion cycloolefin plastic material and the second lens L2 is made of a high-dispersion polycarbonate plastic material. A filter IR such, as an infrared cut filter is located between the fourth lens L4 and the image plane.

Both the surfaces of the first lens L1 have aspheric shapes to suppress spherical aberrations which occur on the first lens L1 and the value of the paraxial curvature radius of its object-side surface r1 is set within an adequate range with respect to the focal length of the overall optical system of the imaging lens.

Figure 11:
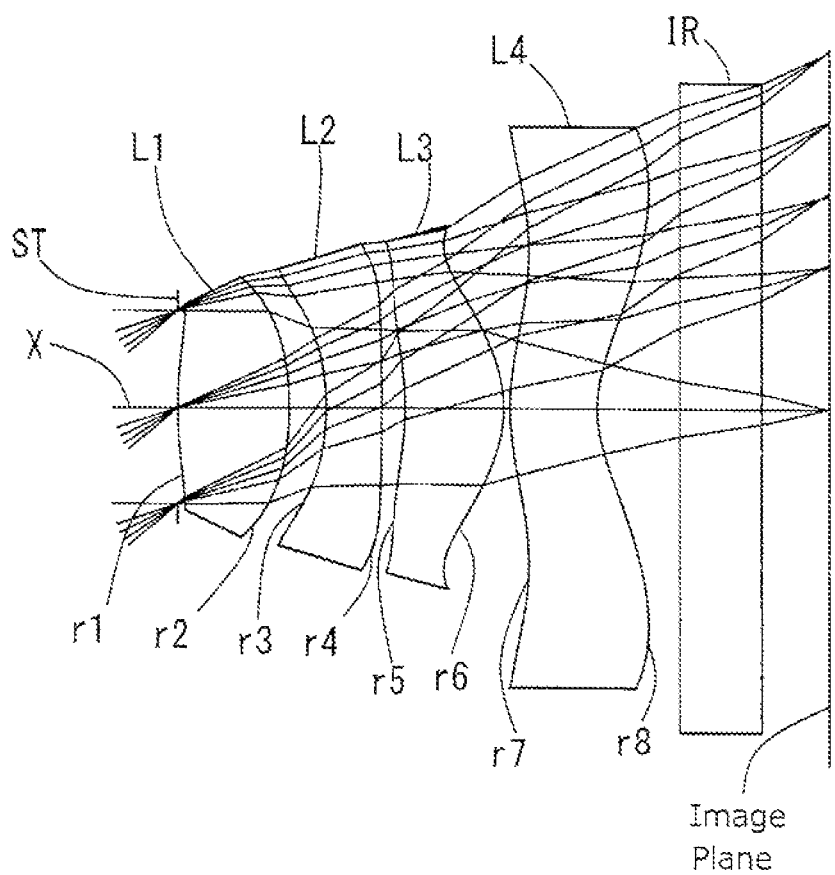
FIG. 11 is a schematic view showing the general configuration of an imaging lens according to Embodiment 6 of the inventions.

The second lens L2 has a biconcave shape near the optical axis X and effectively corrects chromatic aberrations which occur on the first lens L1 and both the surfaces of the second lens L2 have adequate aspheric shapes to suppress paraxial spherical aberrations and off-axial astigmatism and coma aberrations effectively. The shape of the second lens L2 is not limited to a biconcave shape. For example, FIG. 11 shows Embodiment 6 in which the second lens L2 is a meniscus lens in which the object-side surface r3 has a concave shape near the optical axis X and the image-side surface r4 has a convex shape near the optical axis. Both the aspheric surfaces of the second lens L2 may change in shape uniformly from its center to its periphery as in Embodiment 1 shown in FIG. 1 or the object-side surface r3 and image-side surface r4 in the peripheral portion may curve toward the object as in Embodiment 6 and Embodiment 7 shown in FIGS. 11 and 13. When the object-side surface r3 and image-side surface r4 in the lens peripheral portion are curved toward the object, light rays can enter the lens with a wide angle of view and also the distance between the second lens L2 and the third lens L3 can be decreased, thereby making it possible to shorten the total track length further. As explained above, since the second lens L2 can correct various aberrations including chromatic aberrations and has adequate aspheric surfaces, it plays a very important role in enabling the imaging lens to be compact and provide a wide angle of view.

Both the surfaces of each of the third lens L3 and the fourth lens L4 have adequate aspheric shapes so that it is easy to correct off-axial astigmatism and distortion and reduce astigmatic difference. The image-side surface r3 of the fourth lens L4 has an aspheric shape with a pole-change point in a position other than on the optical axis X and has a function to control the CPA. A "pole-change point" here means a point on an aspheric surface in which a tangential plane intersects the optical axis X perpendicularly.

The aperture stop ST is located between the intersection of the object-side surface r1 of the first lens L1 with the optical axis X and the periphery of the object-side surface r1 of the first lens L1 so that the exit pupil position is distant from the image plane and the CPA is easily made nearly perpendicular. Furthermore, the object-side surface r7 and image-side surface r8 in the peripheral portion of the fourth lens L4 both have aspheric shapes curved toward the object. Due to these aspheric shapes of the fourth lens L4, its negative power gradually decreases as the distance from the optical axis X increases. Or as the distance from the optical axis X increases, the negative power of the fourth lens L4 gradually decreases and changes to positive power in the peripheral portion. This change in refractive power allows the fourth lens L4 to control the CRA. When the aspheric image-side surface r8 of the fourth lens L4 is sharply curved toward the object, the aspheric shape of the fourth lens L4 effectively works to make the CRA more nearly perpendicular. In other words, when the positive power in the peripheral portion of the fourth lens L4 becomes stronger, the CRA can be made more nearly perpendicular. In that case, however, inner-reflected light generated in the peripheral portion of the image-side surface r8 of the fourth lens L4 is likely to impinge on the inner surface of the object-side surface r7 of the fourth lens L4 at an angle which induces total reflection. If totally reflected light rays reach the image plane, a ghost phenomenon may cause deterioration in image quality. In this embodiment, since the aperture stop ST is in a position nearest to the object in the lens system to make the exit pupil distant from the image plane and originally the CRA is nearly perpendicular, the burden of CRA control on the aspheric surfaces in the peripheral portion of the fourth lens L4 is reduced and the occurrence of a ghost phenomenon is suppressed.

The imaging lens according to this embodiment satisfies the following conditional expressions (1) to (14):

$$0.56 < r1/f < 1.10 \tag{1}$$

$$0.8 < f1/f3 < 1.41 \tag{2}$$

$$-5.0 < r3/r4 < 0.1 \tag{3}$$

$2.0 < r7/r8 < 4.8$     (4)

$-1.5 < r1/r2 < -0.4$     (5)

$1.66 < r5/r6 < 3.20$     (6)

$1.50 < Nd1 < 1.59$     (7)

$55.0 < vd1 < 57.0$     (8)

$1.60 < Nd2 < 1.67$     (9)

$23.0 < vd2 < 26.0$     (10)

$1.00 < Nd2/Nd1 < 1.10$     (11)

$2.1 < vd1/vd2 < 2.5$     (12)

$0.36 < f12/f34 < 2.47$     (13)

$1.80 < f/EPD < 2.60$     (14)

where f: focal length of the overall optical system of the imaging lens f1: focal length of the first lens L1 f3: focal length of the third lens L3 r1: curvature radius of the object-side surface r1 of the first lens L1 r2: curvature radius of the image-side surface r2 of the first lens L1 r3: curvature radius of the object-side surface r3 of the second lens L2 r4: curvature radius of the image-side surface r4 of the second lens L2 r5: curvature radius of the object-side surface r5 of the third lens L3 r6: curvature radius of the image-side surface r6 of the third lens L3 r7: curvature radius of the object-side surface r7 of the fourth lens L4 r8: curvature radius of the image-side surface r3 of the fourth lens L4

Nd1: refractive index of the first lens L1 at d-ray vd1: Abbe number of the first lens L1 at d-dray Nd2: refractive index of the second lens L2 at d-ray vd2: Abbe number of the second lens L2 at d-dray f12: composite focal length of the first lens L1 and second lens L2 f34: composite focal length of the third lens L3 and fourth lens L4

EPD: exit pupil diameter

In the embodiments, all the lens surfaces are aspheric. The aspheric shapes of these lens surfaces are expressed by the following equation, where Z represents an axis in the optical axis direction, H represents a height perpendicular to the optical axis, k represents a conic constant, and A4, A6, A8, A10, A12, A14, and A16 represent aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$    Equation 1

Next, the imaging lenses according to the embodiments of the present invention will be explained. In each embodiment, f represents the focal length of the overall optical system of the imaging lens, Fno represents an F-number, α represents a half angle of view, ih represents a maximum image height, TTL represents a total track length without a filter IR, etc., and EPD represents an exit pupil diameter, i represents a surface number counted from the object side, r represents a curvature radius, d represents the distance between lens surfaces on the optical axis (surface distance), Nd represents a refractive index with respect to d-ray (reference wavelength), and vd represents an Abbe number with respect to d-ray. As for aspheric surfaces, an asterisk (*) after surface number i indicates that the surface concerned is an aspheric surface.

Embodiment 1

The basic lens data of Embodiment 1 is shown below in Table 1.

TABLE 1

Numerical Example 1 in mm f = 2.22
Fno = 2.20
ω(deg) = 33.7
ih = 1.50
TTL = 2.97
EPD = 1.01

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.05 | | |
| 1* | 1.494 | 0.460 | 1.5346 | 56.16 |
| 2* | −1.800 | 0.056 | | |
| 3* | −6.835 | 0.245 | 1.6355 | 23.91 |
| 4* | 1.844 | 0.344 | | |
| 5* | −1.174 | 0.452 | 1.5346 | 56.16 |
| 6* | −0.546 | 0.027 | | |
| 7* | 1.298 | 0.355 | 1.5346 | 56.16 |
| 8* | 0.525 | 0.250 | | |
| 9 | Infinity | 0.3 | 1.5168 | 64.20 |
| 10 | Infinity | 0.603 | | |
| Image Plane | Infinity | | | |

Constituent Lens Data

| Lens | Start Surface | Focal Length |
|---|---|---|
| 1 | 1 | 1.605 |
| 2 | 3 | −2.260 |
| 3 | 5 | 1.528 |
| 4 | 7 | −1.960 |

Composite Focal Length

| f12 | 3.627 |
| f34 | 4.182 |

Aspheric Surface Data

| | 1st Surface | 2nd Surface | 3rd Surface | 4th Surface |
|---|---|---|---|---|
| k | 2.915E+00 | −4.679E+01 | 0.000E+00 | −2.181E+01 |
| A4 | −1.722E−01 | 2.681E−02 | 1.110E+00 | 1.173E+00 |
| A6 | −2.179E−01 | −3.856E+00 | −9.832E+00 | −6.008E+00 |
| A8 | −7.109E−01 | 8.818E+00 | 2.256E+01 | 1.300E+01 |
| A10 | −3.264E+00 | −7.419E+00 | −1.399E+01 | −1.325E+01 |
| A12 | 1.270E+00 | 0.000E+00 | −3.179E+00 | 5.704E+00 |

TABLE 1-continued

Numerical Example 1
in mm

| | | | | |
|---|---|---|---|---|
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 9.196E−01 | −4.380E+00 | 0.000E+00 | −5.690E+00 |
| A4 | 1.389E+00 | −5.917E−01 | −7.938E−01 | −3.358E−01 |
| A6 | −1.553E+00 | 2.724E+00 | 1.197E+00 | 4.557E−01 |
| A8 | 2.174E+00 | −4.441E+00 | −1.688E+00 | −5.128E−01 |
| A10 | −3.533E+00 | 3.866E+00 | 1.149E+00 | 2.408E−01 |
| A12 | 3.279E+00 | −1.305E+00 | −2.825E−01 | 1.835E−02 |
| A14 | 0.000E+00 | 1.101E−01 | 0.000E+00 | −5.966E−02 |
| A16 | 0.000E+00 | 0.000E+00 | 0.000E+00 | 1.621E−02 |

As shown in Table 8, the imaging lens in Embodiment 1 satisfies all the conditional expressions (1) to (14).

Figure 2:
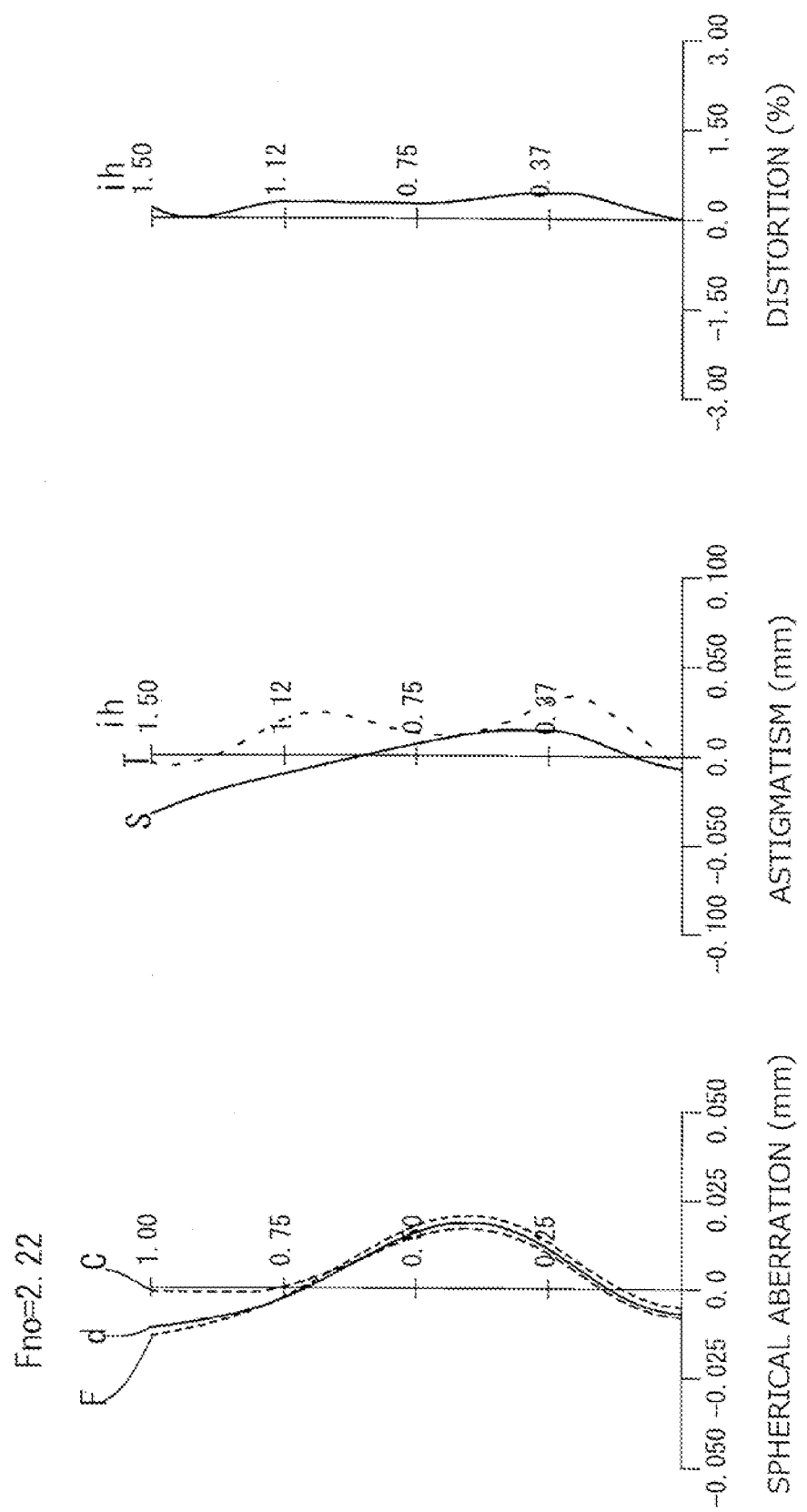
FIG. 2 shows spherical aberration, astigmatism, and distortion of the imaging lens according to Embodiment 1.
Figure 3:
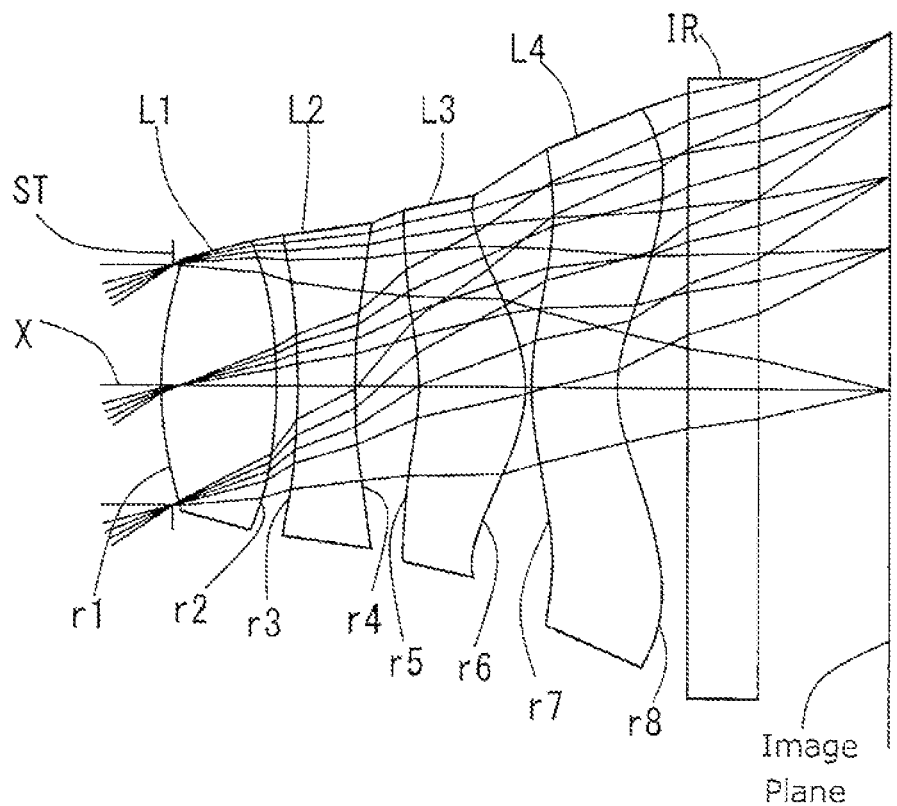
FIG. 3 is a schematic view showing the general configuration of an imaging lens according to Embodiment 2 of the invention.

FIG. 2 shows spherical aberration (mm), astigmatism (mm), and distortion (%) of the imaging lens in Embodiment 1. The spherical aberration graph shows the amount of aberration at wavelengths of F-ray (486 nm), d-ray (588 nm), and C-ray (656 nm). The astigmatism graph shows the amount of aberration on sagittal image surface S and the amount of aberration on tangential image surface T. As FIG. 2 suggests, various aberrations are properly corrected (the same is true for FIGS. 4, 6, 3, 10, 12, and 14 which correspond to Embodiments 2 to 7 respectively).

Embodiment 2

The basic lens data of Embodiment 2 is shown below in Table 2.

TABLE 2

Numerical Example 2
in mm f = 2.21
Fno = 2.19
ω(deg) = 33.9
ih = 1.50
TTL = 2.97
EPD = 1.01

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.05 | | |
| 1* | 1.483 | 0.490 | 1.5346 | 56.16 |
| 2* | −1.800 | 0.090 | | |
| 3* | −2.471 | 0.245 | 1.6355 | 23.91 |
| 4* | 5.000 | 0.271 | | |
| 5* | −1.054 | 0.460 | 1.5346 | 56.16 |
| 6* | −0.573 | 0.027 | | |
| 7* | 1.203 | 0.363 | 1.5346 | 56.16 |
| 8* | 0.533 | 0.250 | | |
| 9 | Infinity | 0.3 | 1.5168 | 64.20 |
| 10 | Infinity | 0.594 | | |
| Image Plane | Infinity | | | |

Constituent Lens Data

| Lens | Start Surface | Focal Length |
|---|---|---|
| 1 | 1 | 1.605 |
| 2 | 3 | −2.570 |

TABLE 2-continued

Numerical Example 2
in mm

| | | |
|---|---|---|
| 3 | 5 | 1.762 |
| 4 | 7 | −2.206 |

Composite Focal Length

| | |
|---|---|
| f12 | 3.199 |
| f34 | 5.345 |

Aspheric Surface Data

| | 1st Surface | 2nd Surface | 3rd Surface | 4th Surface |
|---|---|---|---|---|
| k | 0.000E+00 | 0.000E+00 | 0.000E+00 | 0.000E+00 |
| A4 | −5.632E−02 | 6.521E−01 | 1.297E+00 | 1.217E+00 |
| A6 | −2.367E−01 | −4.266E+00 | −8.803E+00 | −6.169E+00 |
| A8 | −3.804E−02 | 9.279E+00 | 2.153E+01 | 1.287E+01 |
| A10 | −1.922E+00 | −7.375E+00 | −1.696E+01 | −1.302E+01 |
| A12 | 2.162E+00 | 0.000E+00 | −2.775E−01 | 6.020E+00 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 0.000E+00 | −4.387E+00 | 0.000E+00 | −5.516E+00 |
| A4 | 1.645E+00 | −4.573E−01 | −8.876E−01 | −3.642E−01 |
| A6 | −2.527E+00 | 2.430E+00 | 1.222E+00 | 4.722E−01 |
| A8 | 2.231E+00 | −4.456E+00 | −1.654E+00 | −5.100E−01 |
| A10 | −2.183E+00 | 4.219E+00 | 1.170E+00 | 2.350E−01 |
| A12 | 2.579E+00 | −1.003E+00 | −3.217E−01 | 2.483E−02 |
| A14 | 0.000E+00 | −2.340E−01 | 0.000E+00 | −6.523E−02 |
| A16 | 0.000E+00 | 0.000E+00 | 0.000E+00 | 1.786E−02 |

As shown in Table 8, the imaging lens in Embodiment 2 satisfies all the conditional expressions (1) to (14).

Figure 4:
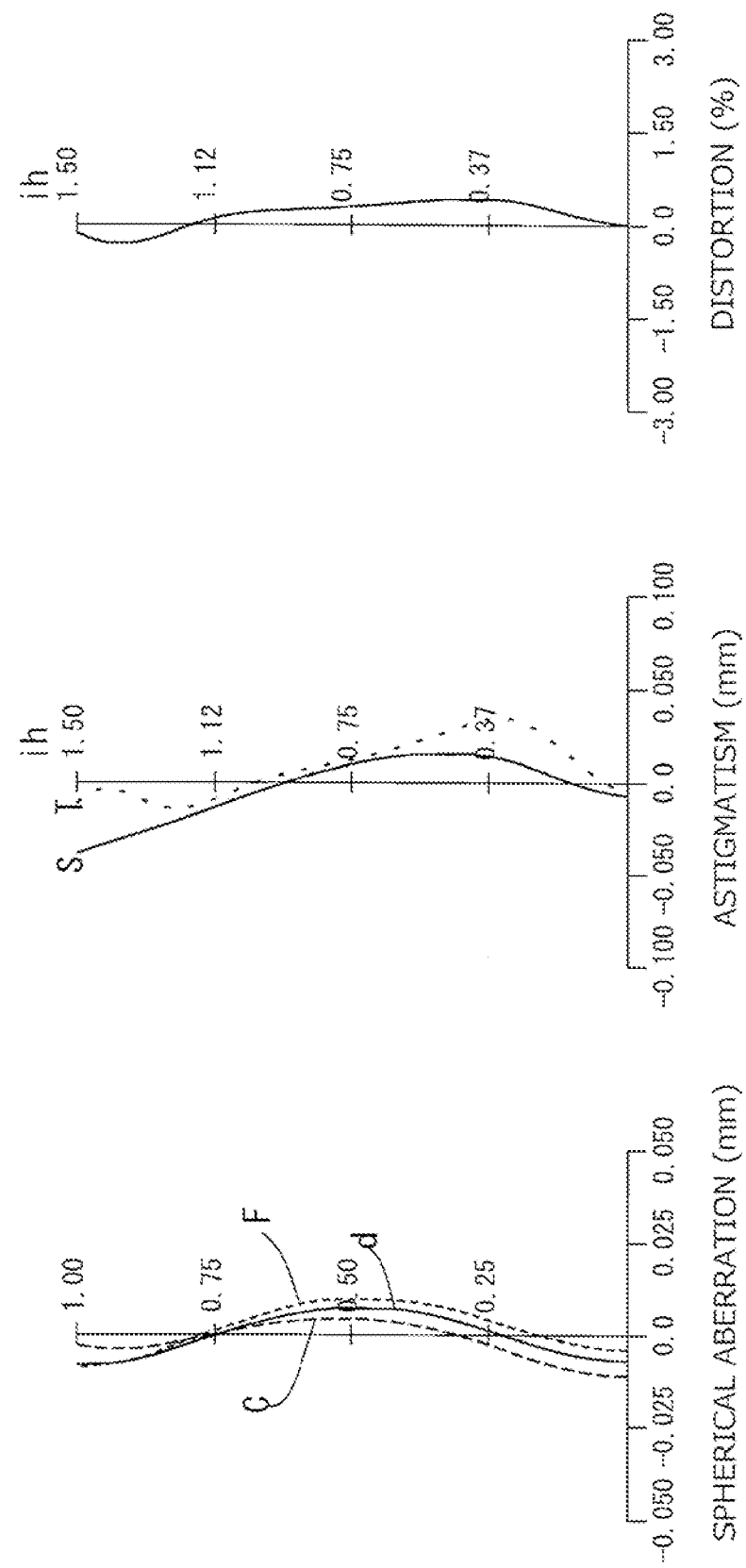
FIG. 4 shows spherical aberration, astigmatism, and distortion of the imaging lens according to Embodiment 2.
Figure 5:
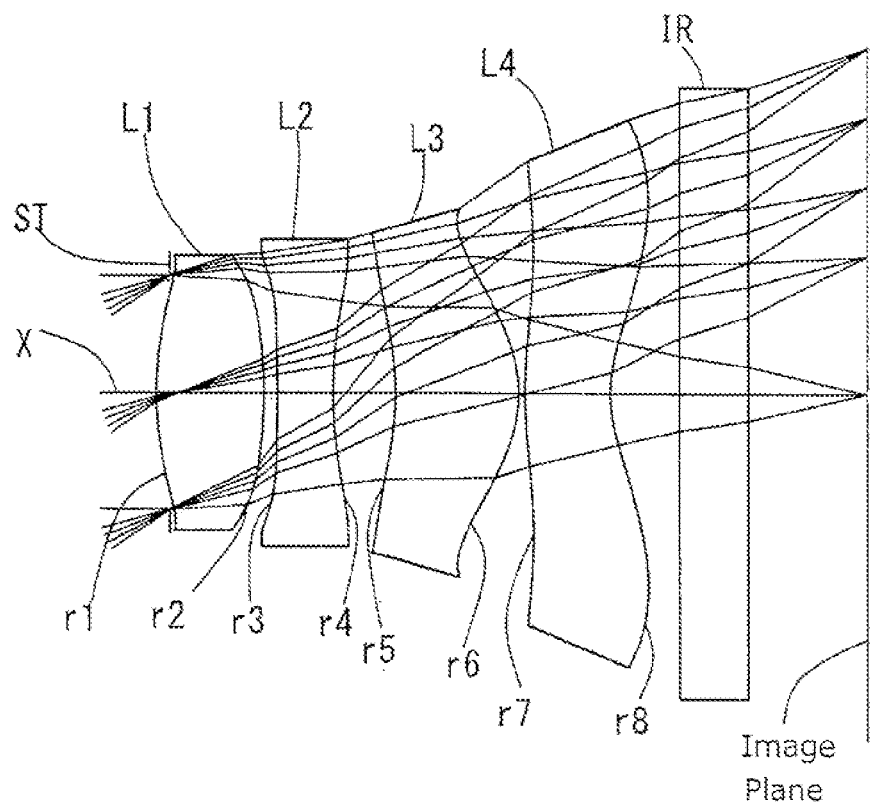
FIG. 5 is a schematic view showing the general configuration of an imaging lens according to Embodiment 3 of the invention.

FIG. 4 shows spherical aberration, astigmatism, and distortion of the imaging lens in Embodiment 2. As FIG. 4 suggests, various aberrations are properly corrected.

Embodiment 3

The basic lens data of Embodiment 3 is shown below in Table 3.

TABLE 3

Numerical Example 3
in mm f = 2.22
Fno = 2.20
ω(deg) = 33.9
ih = 1.50
TTL = 2.98
EPD = 1.01

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.057 | | |
| 1* | 1.459 | 0.471 | 1.5346 | 56.16 |
| 2* | −1.849 | 0.057 | | |
| 3* | −7.075 | 0.245 | 1.6355 | 23.91 |
| 4* | 2.247 | 0.272 | | |
| 5* | −1.218 | 0.547 | 1.5346 | 56.16 |
| 6* | −0.550 | 0.027 | | |
| 7* | 2.105 | 0.374 | 1.5346 | 56.16 |
| 8* | 0.600 | 0.250 | | |

TABLE 3-continued

Numerical Example 3
in mm

| 9 | Infinity | 0.3 | 1.5168 | 64.20 |
|---|---|---|---|---|
| 10 | Infinity | 0.557 | | |
| Image Plane | Infinity | | | |

Constituent Lens Data

| Lens | Start Surface | Focal Length |
|---|---|---|
| 1 | 1 | 1.605 |
| 2 | 3 | −2.657 |
| 3 | 5 | 1.459 |
| 4 | 7 | −1.718 |

Composite Focal Length

| f12 | 3.042 |
|---|---|
| f34 | 5.824 |

Aspheric Surface Data

| | 1st Surface | 2nd Surface | 3rd Surface | 4th Surface |
|---|---|---|---|---|
| k | 0.000E+00 | 0.000E+00 | 0.000E+00 | 0.000E+00 |
| A4 | −7.682E−02 | 6.039E−01 | 7.730E−01 | 5.671E−01 |
| A6 | −3.605E−02 | −5.741E+00 | −7.379E+00 | −3.803E+00 |
| A8 | −2.638E+00 | 1.340E+01 | 1.496E+01 | 8.367E+00 |
| A10 | 8.511E+00 | −1.344E+01 | −7.892E+00 | −1.203E+01 |
| A12 | −2.045E+01 | 0.000E+00 | −4.153E−01 | 8.802E+00 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 0.000E+00 | −3.614E+00 | 0.000E+00 | −6.128E+00 |
| A4 | 7.032E−01 | −4.822E−01 | −5.708E−01 | −4.010E−01 |
| A6 | −8.101E−01 | 1.240E+00 | 6.124E−01 | 5.405E−01 |
| A8 | 4.171E+00 | −1.314E+00 | −4.352E−01 | −6.860E−01 |
| A10 | −1.146E+01 | 2.831E+00 | 1.394E−01 | 5.965E−01 |
| A12 | 9.421E+00 | −2.137E+00 | 4.478E−02 | −3.325E−01 |
| A14 | 0.000E+00 | 0.000E+00 | −2.988E−02 | 1.019E−01 |
| A16 | 0.000E+00 | 0.000E+00 | 0.000E+00 | −1.235E−02 |

As shown in Table 8, the imaging lens in Embodiment 3 satisfies all the conditional expressions (1) to (14).

Figure 6:
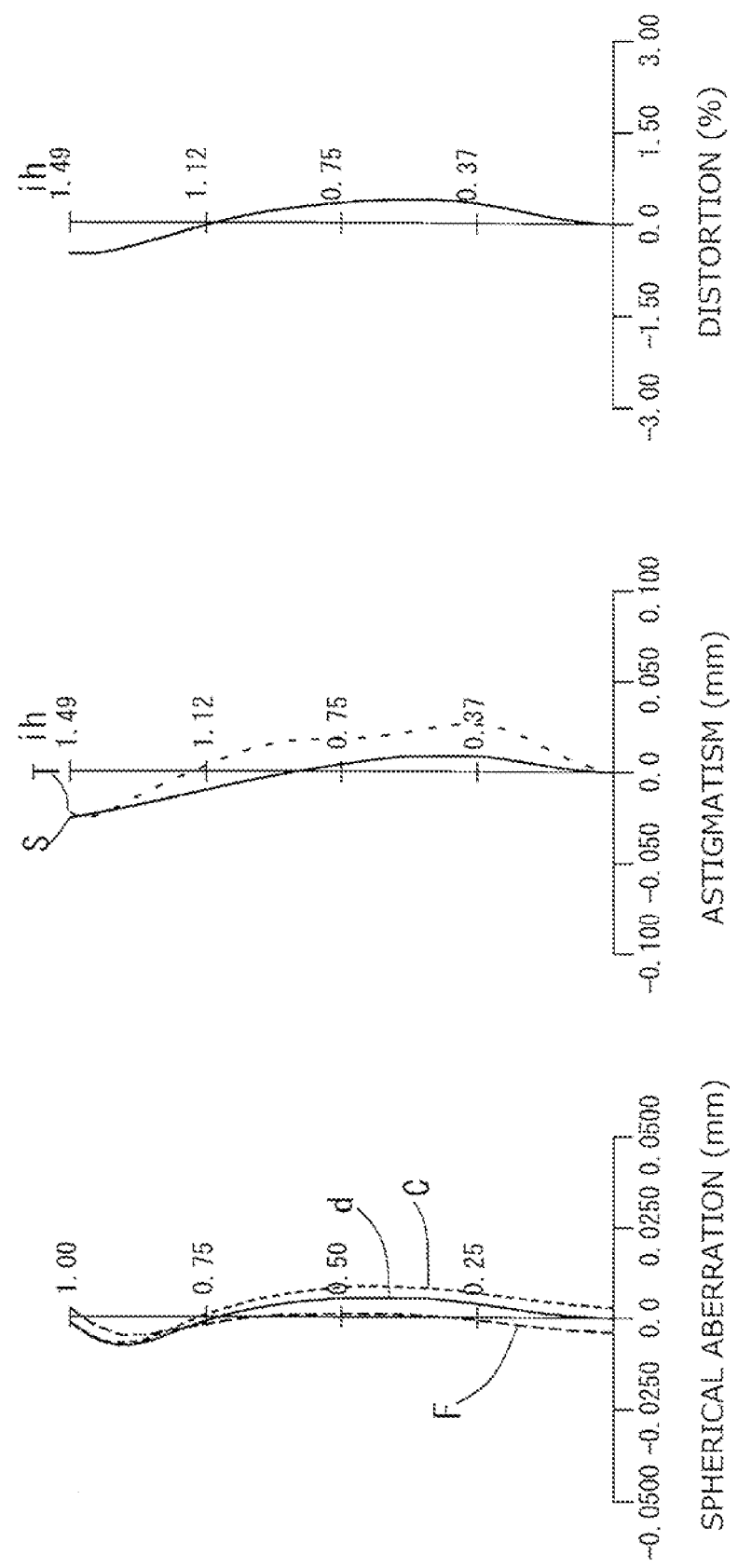
FIG. 6 shows spherical aberration, astigmatism, and distortion of the imaging lens according to Embodiment 3.
Figure 7:
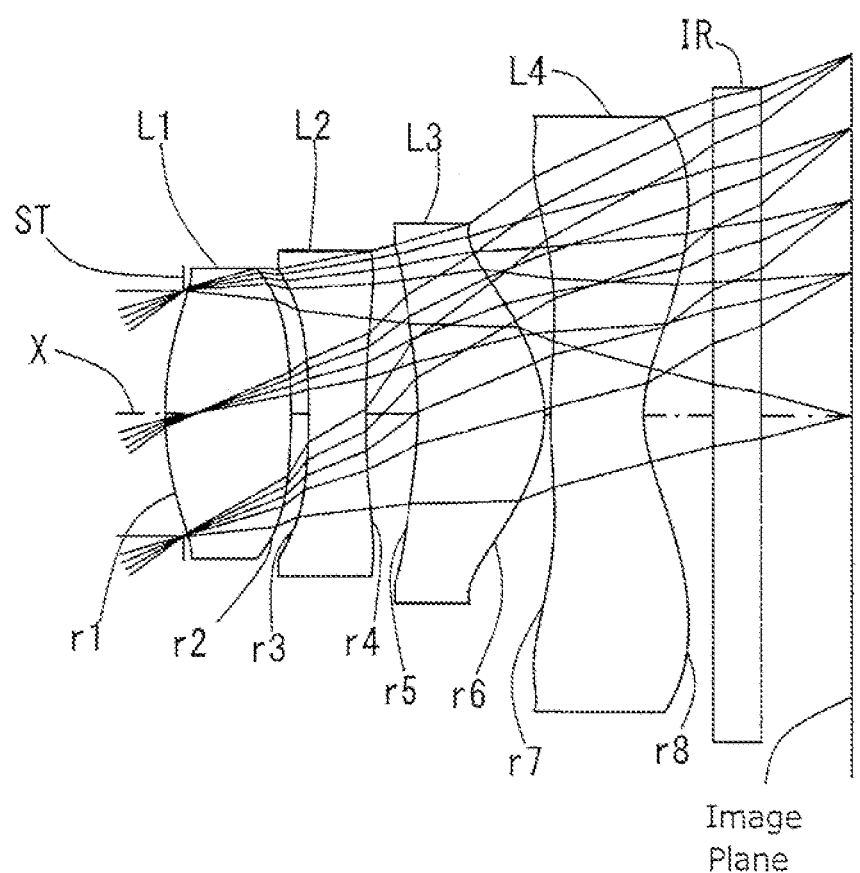
FIG. 7 is a schematic view showing the general configuration of an imaging lens according to Embodiment 4 of the invention.

FIG. 6 shows spherical aberration, astigmatism, and distortion of the imaging lens in Embodiment 3. As FIG. 6 suggests, various aberrations are properly corrected.

Embodiment 4

The basic lens data of Embodiment 4 is shown below in Table 4.

TABLE 4

Numerical Example 4
in mm f = 2.11
Fno = 2.01
ω(deg) = 36.4
ih = 1.55
TTL = 2.91
EPD = 1.05

TABLE 4-continued

Numerical Example 4
in mm

Surface Data

| Surface No. i | Curvature Radius r | Surface Distance d | Refractive Index Nd | Abbe Number νd |
|---|---|---|---|---|
| (Object Surface) | Infinity | Infinity | | |
| Stop | Infinity | −0.080 | | |
| 1* | 1.326 | 0.547 | 1.5438 | 55.57 |
| 2* | −2.646 | 0.076 | | |
| 3* | −2.811 | 0.250 | 1.6355 | 23.91 |
| 4* | 6.456 | 0.230 | | |
| 5* | −1.633 | 0.551 | 1.5438 | 55.57 |
| 6* | −0.562 | 0.027 | | |
| 7* | 2.394 | 0.404 | 1.5438 | 55.57 |
| 8* | 0.550 | 0.250 | | |
| 9 | Infinity | 0.3 | 1.5168 | 64.20 |
| 10 | Infinity | 0.434 | | |
| Image Plane | Infinity | | | |

Constituent Lens Data

| Lens | Start Surface | Focal Length |
|---|---|---|
| 1 | 1 | 1.707 |
| 2 | 3 | −3.049 |
| 3 | 5 | 1.334 |
| 4 | 7 | −1.423 |

Composite Focal Length

| f12 | 3.040 |
|---|---|
| f34 | 5.825 |

Aspheric Surface Data

| | 1st Surface | 2nd Surface | 3rd Surface | 4th Surface |
|---|---|---|---|---|
| k | 0.000E+00 | 0.000E+00 | 0.000E+00 | 0.000E+00 |
| A4 | −8.124E−02 | 1.425E−01 | 4.263E−01 | 6.478E−01 |
| A6 | 5.242E−01 | −3.102E+00 | −5.351E+00 | −3.426E+00 |
| A8 | −5.236E+00 | 6.136E+00 | 1.134E+01 | 7.497E+00 |
| A10 | 1.741E+01 | −5.678E+00 | −1.014E+01 | −9.755E+00 |
| A12 | −2.739E+01 | 0.000E+00 | 6.042E+00 | 5.258E+00 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 0.000E+00 | −3.743E+00 | 0.000E+00 | −5.114E+00 |
| A4 | 5.966E−01 | −6.926E−01 | −7.911E−01 | −4.304E−01 |
| A6 | −1.483E+00 | 1.699E+00 | 8.738E−01 | 5.656E−01 |
| A8 | 3.055E+00 | −3.039E+00 | −4.419E−01 | −5.761E−01 |
| A10 | −3.034E+00 | 4.013E+00 | −4.382E−02 | 3.678E−01 |
| A12 | 2.532E−01 | −4.304E−01 | 1.766E−01 | −1.352E−01 |
| A14 | 0.000E+00 | −1.132E+00 | −5.920E−02 | 2.115E−02 |
| A16 | 0.000E+00 | −4.085E−01 | 0.000E+00 | 5.310E−05 |

As shown in Table 8, the imaging lens in Embodiment 4 satisfies all the conditional expressions (1) to (14).

Figure 8:
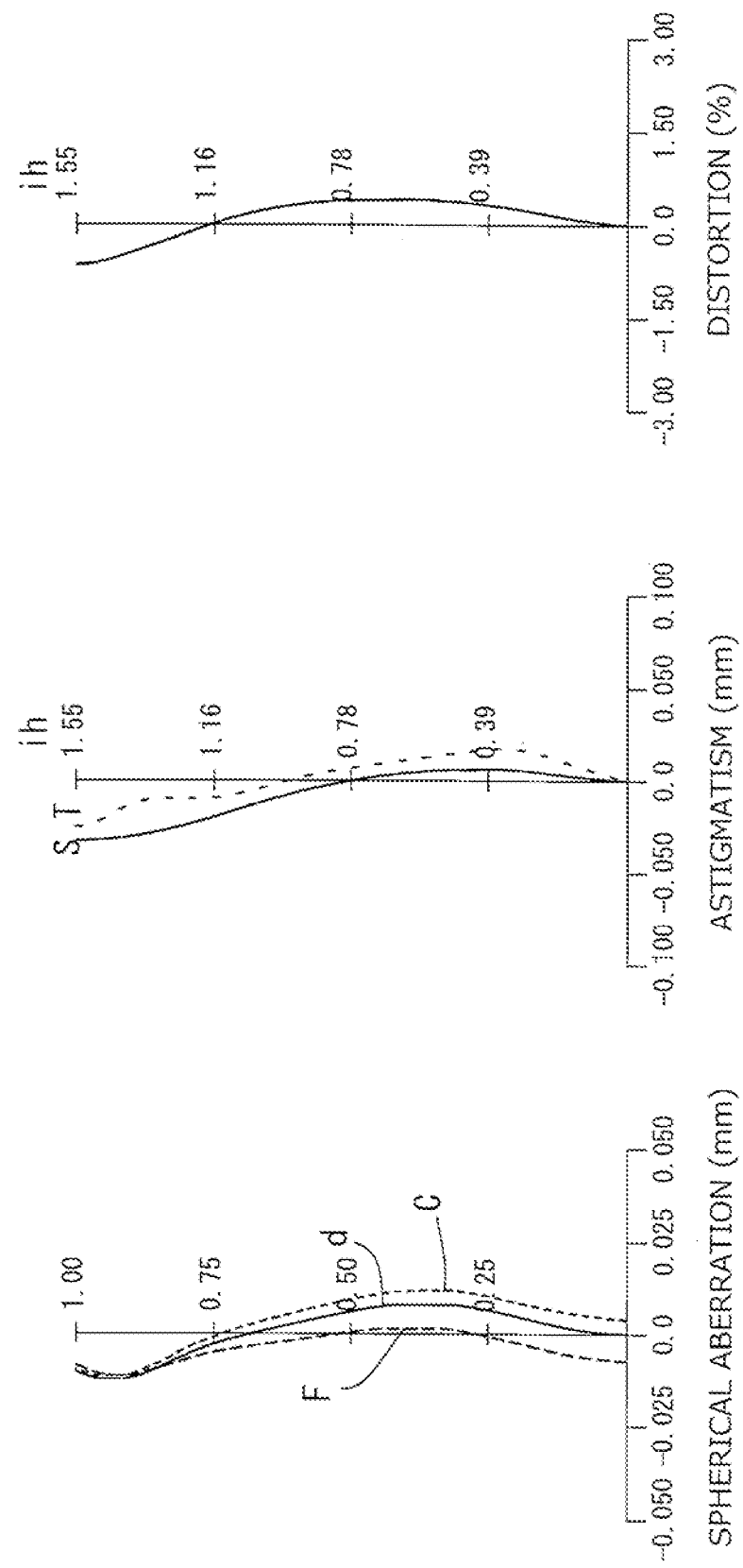
FIG. 8 shows spherical aberration, astigmatism, and distortion of the imaging lens according to Embodiment 4.
Figure 9:
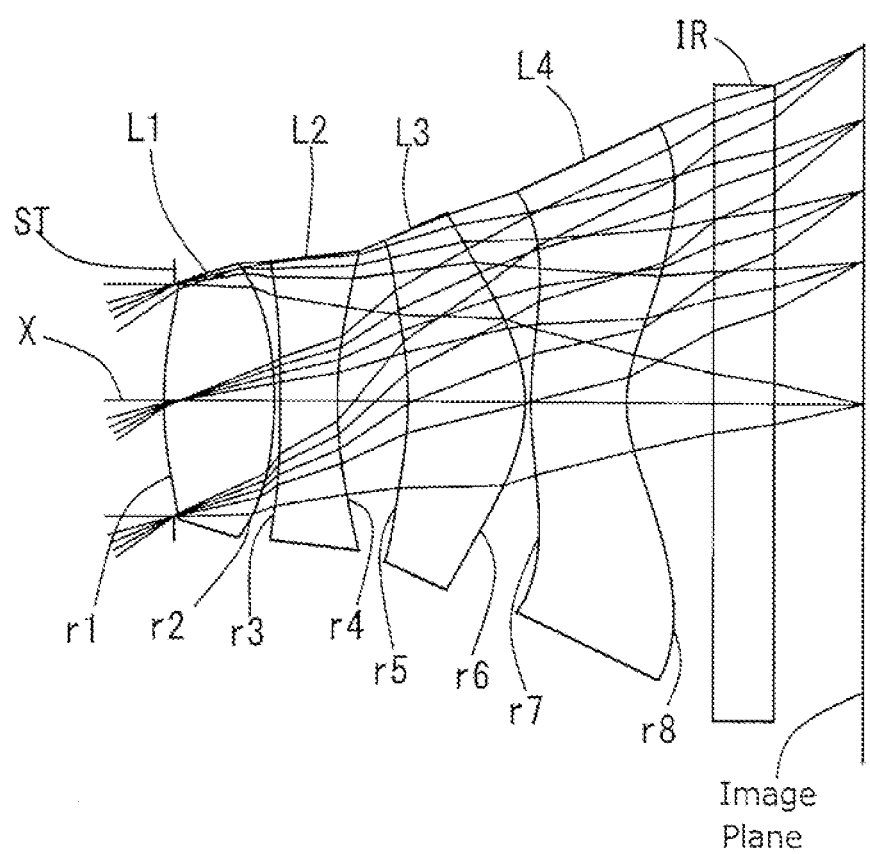
FIG. 9 is a schematic view showing the general configuration of an imaging lens according to Embodiment 5 of the invention.

FIG. 8 shows spherical aberration, astigmatism, and distortion of the imaging lens in Embodiment 4. As FIG. 8 suggests, various aberrations are properly corrected.

Embodiment 5

The basic lens data of Embodiment 5 is shown below in Table 5.

TABLE 5

Numerical Example 5
in mm f = 1.76
Fno = 2.20
ω(deg) = 35.1
ih = 1.23
TTL = 2.35
EPD = 0.80

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.035 | | |
| 1* | 1.270 | 0.384 | 1.5346 | 56.16 |
| 2* | −1.232 | 0.020 | | |
| 3* | −5.534 | 0.200 | 1.6355 | 23.91 |
| 4* | 1.729 | 0.245 | | |
| 5* | −1.137 | 0.412 | 1.5346 | 56.16 |
| 6* | −0.502 | 0.020 | | |
| 7* | 1.341 | 0.333 | 1.5346 | 56.16 |
| 8* | 0.455 | 0.200 | | |
| 9 | Infinity | 0.21 | 1.5168 | 64.20 |
| 10 | Infinity | 0.405 | | |
| Image Plane | Infinity | | | |

Constituent Lens Data

| Lens | Start Surface | Focal Length |
|---|---|---|
| 1 | 1 | 1.236 |
| 2 | 3 | −2.051 |
| 3 | 5 | 1.373 |
| 4 | 7 | −1.484 |

Composite Focal Length

| | |
|---|---|
| f12 | 2.398 |
| f34 | 6.053 |

Aspheric Surface Data

| | 1st Surface | 2nd Surface | 3rd Surface | 4th Surface |
|---|---|---|---|---|
| k | −4.541E−01 | 4.591E+00 | 1.797E+01 | 4.667E+00 |
| A4 | −3.084E−01 | 7.617E−01 | 5.023E−01 | 3.349E−01 |
| A6 | −7.050E−01 | −1.061E+01 | −8.662E+00 | −2.397E+00 |
| A8 | −1.609E+00 | 5.039E+01 | 7.578E+00 | −1.151E+01 |
| A10 | −2.963E+01 | −1.090E+02 | 1.558E+02 | 7.875E+01 |
| A12 | 0.000E+00 | 1.444E+02 | −3.645E+02 | −1.199E+02 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | −7.661E−01 | −8.945E−01 | 1.646E+00 | −4.904E+00 |
| A4 | 1.142E+00 | 1.679E+00 | −1.785E+00 | −7.319E−01 |
| A6 | −8.712E−01 | −5.138E+00 | 3.772E+00 | 1.488E+00 |
| A8 | −3.114E+00 | 1.819E+00 | −8.154E+00 | −2.646E+00 |
| A10 | 0.000E+00 | −3.585E+01 | 7.245E+00 | 2.945E+00 |
| A12 | 0.000E+00 | 2.639E+01 | 3.028E+00 | −1.926E+00 |
| A14 | 0.000E+00 | 0.000E+00 | −1.057E+01 | 6.179E−01 |
| A16 | 0.000E+00 | 0.000E+00 | 2.789E+00 | −6.409E−02 |

As shown in Table 8, the imaging lens in Embodiment 5 satisfies all the conditional expressions (1) to (14).

Figure 10:
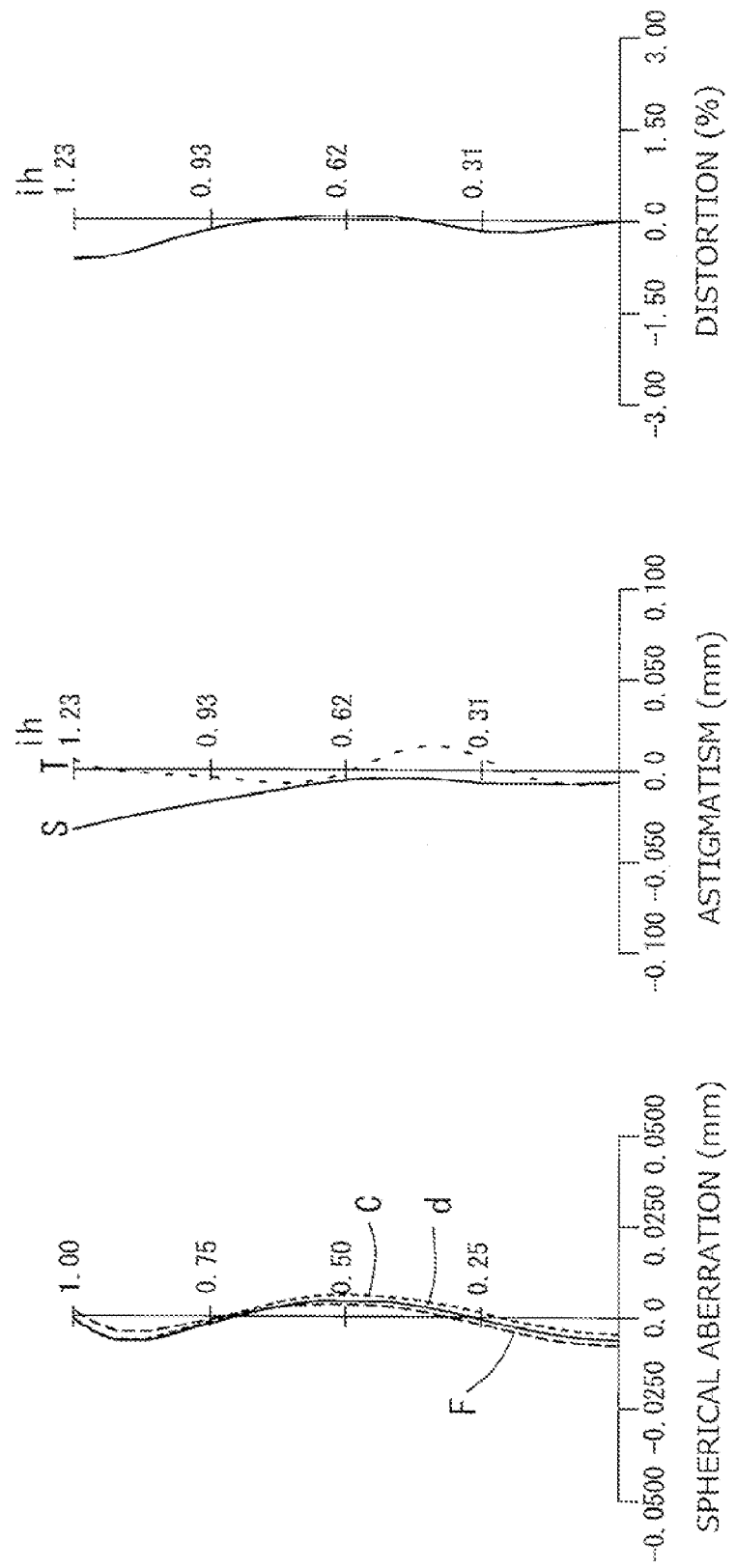
FIG. 10 shows spherical aberration, astigmatism, and distortion of the imaging lens according to Embodiment 5.

FIG. 10 shows spherical aberration, astigmatism, and distortion of the imaging lens in Embodiment 5. As FIG. 10 suggests, various aberrations are properly corrected.

The imaging lenses according to Embodiments 1 to 5 as mentioned above provide high brightness with an F-value of 2.0 to 2.2, and a wide angle of view (about 70 degrees). Furthermore, the total track length of each of these lenses is shorter than the diagonal length of the effective image plane of the image sensor, suggesting that a compact lens system capable of correcting aberrations properly is obtained.

Embodiment 6

The basic lens data of Embodiment 6 is shown below in Table 6.

TABLE 6

Numerical Example 6
in mm f = 1.54
Fno = 2.22
ω(deg) = 39.82
ih = 1.29
TTL = 2.28
EPD = 0.70

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | 0.000 | | |
| 1* | 1.540 | 0.406 | 1.5438 | 55.57 |
| 2* | −1.114 | 0.136 | | |
| 3* | −0.984 | 0.203 | 1.6142 | 25.58 |
| 4* | −12.210 | 0.090 | | |
| 5* | −1.003 | 0.362 | 1.5438 | 55.57 |
| 6* | −0.478 | 0.023 | | |
| 7* | 0.943 | 0.319 | 1.5438 | 55.57 |
| 8* | 0.465 | 0.250 | | |
| 9 | Infinity | 0.3 | 1.5168 | 64.20 |
| 10 | Infinity | 0.243 | | |
| Image Plane | Infinity | | | |

Constituent Lens Data

| Lens | Start Surface | Focal Length |
|---|---|---|
| 1 | 1 | 1.257 |
| 2 | 3 | −1.755 |
| 3 | 5 | 1.351 |
| 4 | 7 | −2.209 |

Composite Focal Length

| | |
|---|---|
| f12 | 2.981 |
| f34 | 2.401 |

Aspheric Surface Data

| | 1st Surface | 2nd Surface | 3rd Surface | 4th Surface |
|---|---|---|---|---|
| k | 0.000E+00 | 0.000E+00 | 0.000E+00 | 0.000E+00 |
| A4 | −3.775E−01 | −1.239E+00 | −1.806E+00 | 2.006E−01 |
| A6 | −4.323E+00 | −1.606E+00 | −2.194E+00 | −3.226E+00 |
| A8 | 1.061E+01 | 1.296E+01 | 6.329E+01 | 1.534E+01 |
| A10 | −3.214E+01 | −3.702E+01 | −2.028E+02 | −6.202E+01 |
| A12 | −2.629E+02 | 0.000E+00 | 2.485E+02 | 7.710E+01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 0.000E+00 | −3.085E+00 | 0.000E+00 | −4.190E+00 |
| A4 | 2.349E+00 | −9.484E−01 | −1.440E+00 | −6.822E−01 |
| A6 | −5.982E+00 | 4.615E+00 | 4.816E−01 | 1.106E+00 |
| A8 | 8.953E+00 | −1.626E+01 | 2.529E+00 | −1.505E+00 |
| A10 | −5.530E+00 | 4.515E+01 | −4.568E+00 | 1.527E+00 |
| A12 | −7.951E+00 | 2.421E+01 | −1.572E+00 | −1.203E+00 |
| A14 | 0.000E+00 | −2.222E+02 | 9.169E+00 | 6.125E−01 |
| A16 | 0.000E+00 | 1.907E+02 | −5.940E+00 | −1.390E−01 |

As shown in Table 8, the imaging lens in Embodiment 6 satisfies all the conditional expressions (1) to (14).

Figure 12:
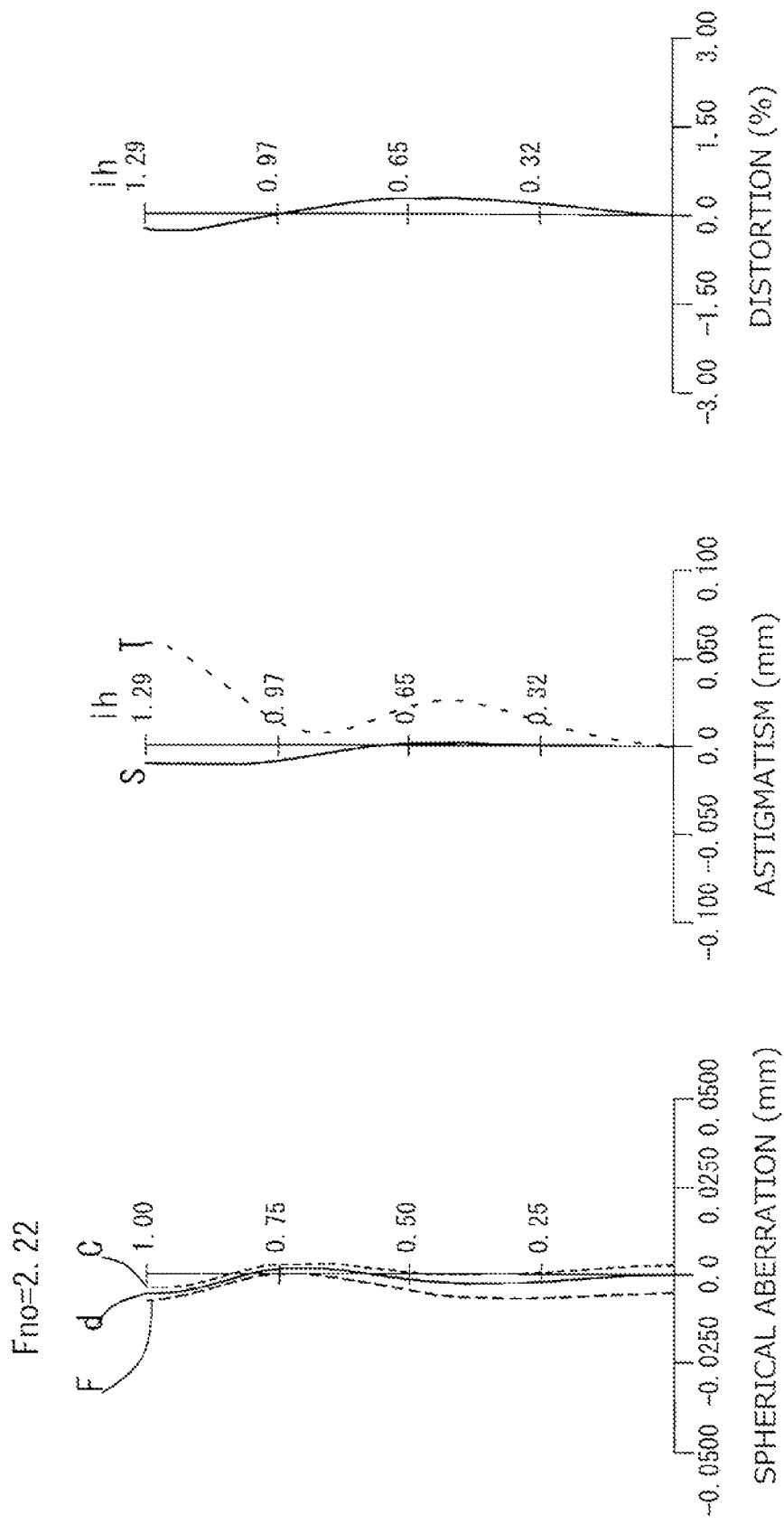
FIG. 12 shows spherical aberration, astigmatism, and distortion of the imaging lens according to Embodiment 6.
Figure 13:
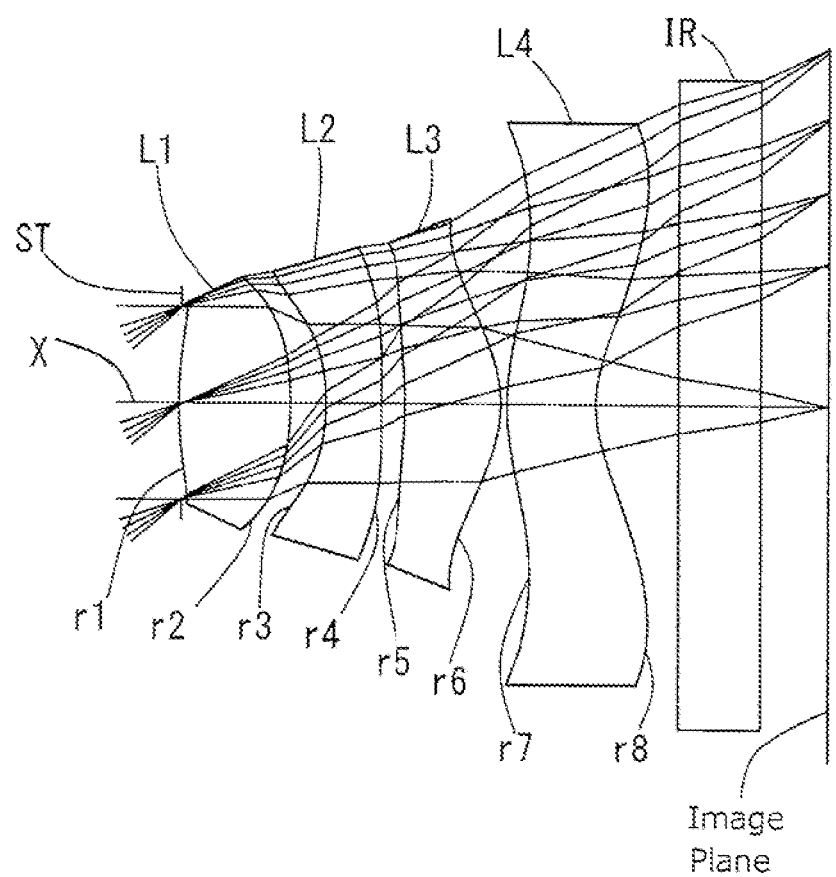
FIG. 13 is a schematic view showing the general configuration of an imaging lens according to Embodiment 7 of the invention.

FIG. 12 shows spherical aberration, astigmatism, and distortion of the imaging lens in Embodiment 6. As FIG. 12 suggests, various aberrations are properly corrected.

Embodiment 7

The basic lens data of Embodiment 7 is shown below in Table 7.

TABLE 7

Numerical Example 7
in mm $f = 1.54$
$Fno = 2.22$
$\omega(deg) = 40.0$
$ih = 1.29$
$TTL = 2.27$
$EPD = 0.70$ Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.010 | | |
| 1* | 1.387 | 0.407 | 1.5438 | 55.57 |
| 2* | −1.203 | 0.131 | | |
| 3* | −0.877 | 0.203 | 1.6142 | 25.58 |
| 4* | 200.000 | 0.090 | | |
| 5* | −1.364 | 0.351 | 1.5438 | 55.57 |
| 6* | −0.484 | 0.023 | | |
| 7* | 0.955 | 0.325 | 1.5438 | 55.57 |
| 8* | 0.465 | 0.300 | | |
| 9 | Infinity | 0.3 | 1.5168 | 64.20 |
| 10 | Infinity | 0.245 | | |
| Image Plane | Infinity | | | |

Constituent Lens Data

| Lens | Start Surface | Focal Length |
|---|---|---|
| 1 | 1 | 1.254 |
| 2 | 3 | −1.421 |
| 3 | 5 | 1.208 |
| 4 | 7 | −2.175 |

TABLE 7-continued

Numerical Example 7
in mm

Composite Focal Length

| f12 | 4.163 |
|---|---|
| f34 | 1.856 |

Aspheric Surface Data

| | 1st Surface | 2nd Surface | 3rd Surface | 4th Surface |
|---|---|---|---|---|
| k | 0.000E+00 | 0.000E+00 | 0.000E+00 | 0.000E+00 |
| A4 | −1.262E−01 | −1.959E+00 | −4.535E+00 | −1.219E+00 |
| A6 | −8.600E+00 | −8.374E−02 | 1.501E+01 | −1.472E+00 |
| A8 | 4.918E+01 | 1.161E+01 | 3.159E+01 | 2.275E+01 |
| A10 | −2.104E+02 | −4.898E+01 | −1.953E+02 | −5.917E+01 |
| A12 | −2.629E+02 | 0.000E+00 | 2.779E+02 | 4.425E+01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 0.000E+00 | −3.319E+00 | 0.000E+00 | −4.643E+00 |
| A4 | 2.988E+00 | −2.657E−01 | −1.118E+00 | −5.533E−01 |
| A6 | −1.407E+01 | 5.420E−01 | −1.716E−01 | 8.722E−01 |
| A8 | 2.802E+01 | −2.116E+01 | 2.545E+00 | −1.345E+00 |
| A10 | −6.535E+00 | 3.455E+01 | −3.320E+00 | 1.532E+00 |
| A12 | −4.541E+01 | 3.289E+01 | −1.236E+00 | −1.215E+00 |
| A14 | 0.000E+00 | −1.723E+02 | 5.651E+00 | 5.699E−01 |
| A16 | 0.000E+00 | 1.508E+02 | −3.487E+00 | −1.171E−01 |

As shown in Table 3, the Imaging lens in Embodiment 7 satisfies all the conditional expressions (1) to (14).

Figure 14:
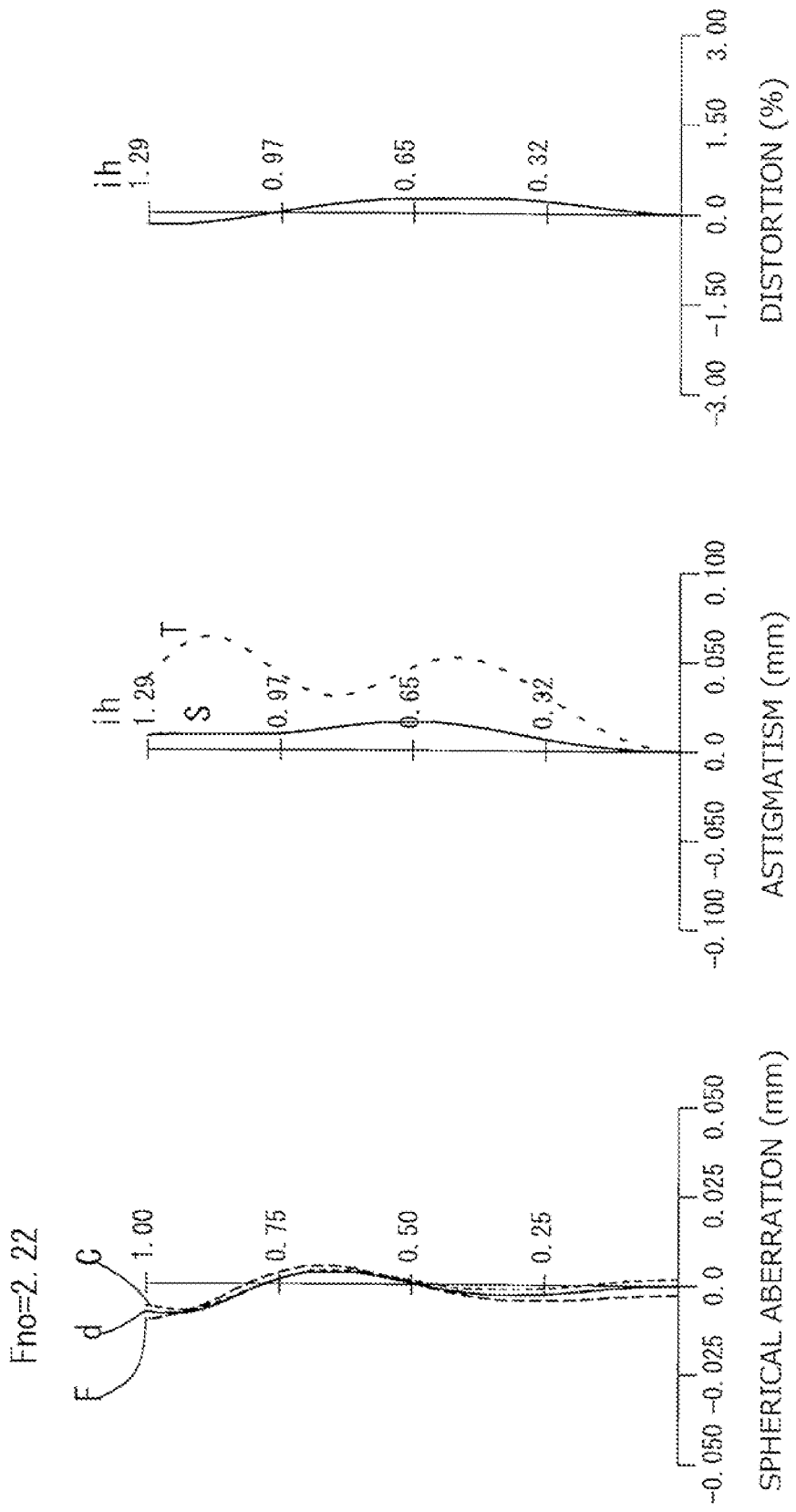
FIG. 14 shows spherical aberration, astigmatism, and distortion of the imaging lens according to Embodiment 7.

FIG. 14 shows spherical aberration, astigmatism, and distortion of the imaging lens in Embodiment 7. As FIG. 14 suggests, various aberrations are properly corrected.

The imaging lenses according to Embodiment 6 and Embodiment 7 as mentioned above provide high brightness with an F-value of about 2.2, and a wide angle of view (about 80 degrees). Furthermore, the total track length of each of these lenses, which is shorter than the diagonal length of the effective image plane of the image sensor, is shorter than in Embodiments 1 to 5, suggesting that a compact lens system capable of correcting aberrations properly is obtained.

Table 8 shows data on Embodiments 1 to 7 relating to the conditional expressions (1) to (14).

TABLE 8

Value of Conditional Expressions

| | Embodiment 1 | Embodiment 2 | Embodiment 3 | Embodiment 4 | Embodiment 5 | Embodiment 6 | Embodiment 7 |
|---|---|---|---|---|---|---|---|
| (1) 0.56 < r1/f < 1.10 | 0.67 | 0.67 | 0.66 | 0.66 | 0.72 | 1.00 | 0.90 |
| (2) 0.86 < f1/f3 < 1.41 | 1.05 | 0.91 | 1.10 | 1.28 | 0.90 | 0.93 | 1.04 |
| (3) −5.0 < r3/r4 < 0.1 | −3.71 | −0.49 | −3.15 | −0.44 | −3.20 | 0.08 | −0.004 |
| (4) 2.0 < r7/r8 < 4.8 | 2.47 | 2.26 | 3.51 | 4.35 | 2.94 | 2.03 | 2.05 |
| (5) −1.5 < r1/r2 < −0.4 | −0.83 | −0.82 | −0.79 | −0.50 | −1.03 | −1.38 | −1.15 |
| (6) 1.66 < r5/r6 < 3.20 | 2.15 | 1.84 | 2.21 | 2.91 | 2.26 | 2.10 | 2.82 |
| (7) 1.50 < nd1 < 1.59 | 1.535 | 1.535 | 1.535 | 1.544 | 1.535 | 1.544 | 1.544 |
| (8) 55.0 < vd1 < 57.0 | 56.16 | 53.16 | 56.16 | 55.37 | 56.16 | 55.57 | 55.57 |
| (9) 1.60 < nd2 < 1.67 | 1.635 | 1.635 | 1.635 | 1.635 | 1.635 | 1.614 | 1.614 |
| (10) 23.0 < vd2 < 26.0 | 23.91 | 23.91 | 23.91 | 23.91 | 23.91 | 25.58 | 25.58 |
| (11) 1.00 < Nd2/Nd1 < 1.10 | 1.07 | 1.07 | 1.07 | 1.06 | 1.07 | 1.05 | 1.05 |
| (12) 2.1 < vd1/vd2 < 2.5 | 2.35 | 2.35 | 2.35 | 2.32 | 2.35 | 2.17 | 2.17 |
| (13) 0.36 < f12/f34 < 2.47 | 0.87 | 0.60 | 0.52 | 0.52 | 0.40 | 1.24 | 2.24 |
| (14) 1.80 < f/EPD < 2.60 | 2.20 | 2.19 | 2.20 | 2.01 | 2.20 | 2.22 | 2.22 |

As explained so far, when the imaging lens according to any of the aforementioned embodiments is used for an optical system built in an image pickup device mounted in a mobile terminal such as a mobile phone, smart phone, or PDA (Personal Digital Assistant), or a game console or information terminal such as a PC, it provides a compact high-performance camera function.

The effects of the present invention are as follows.

According to the present invention, it is possible to provide a compact imaging lens which can correct various aberrations properly with a small F-value and provides a wide angle of view. Also, when plastic material is used as the material for all the constituent lenses, the imaging lens can be mass-produced at low cost.

What is claimed is:

1. A fixed-focus imaging lens which forms an image of an object on a solid-state image sensor, in which elements are arranged in order from an object side to an image side, comprising:
   an aperture stop;
   a first lens with positive refractive power having convex surfaces on the object side and the image side;
   a second lens as a double-sided aspheric lens with negative refractive power having a concave surface on the object side near an optical axis;
   a third lens as a meniscus double-sided aspheric lens with positive refractive power having a convex surface on the image side near the optical axis; and
   a fourth lens as a meniscus double-sided aspheric lens with negative refractive power having a concave surface on the image side near the optical axis,
   wherein all the lenses are made of plastic material; and
   wherein conditional expressions (1), (2), (3), and (4) below are satisfied;

$$0.56 < r1/f < 1.10 \quad (1)$$

$$0.86 < f1/f3 < 1.41 \quad (2)$$

$$-5.0 < r3/r4 < 0.1 \quad (3)$$

$$2.0 < r7/r8 < 4.8 \quad (4)$$

where
f: focal length of the overall optical system of the imaging lens
f1: focal length of the first lens
f3: focal length of the third lens
r1: curvature radius of the object-side surface of the first lens
r3: curvature radius of the object-side surface of the second lens
r4: curvature radius of the image-side surface of the second lens
r7: curvature radius of the object-side surface of the fourth lens
r8: curvature radius of the image-side surface of the fourth lens.

2. The imaging lens according to claim 1, wherein a conditional expression (5) below is satisfied:

$$-1.5 < r1/r2 < -0.4 \quad (5)$$

where
r1: curvature radius of the object-side surface of the first lens
r2: curvature radius of the image-side surface of the first lens.

3. The imaging lens according to claim 1, wherein a conditional expression (6) below is satisfied:

$$1.66 < r5/r6 < 3.20 \quad (6)$$

where
r5: curvature radius of the object-side surface of the third lens
r6: curvature radius of the image-side surface of the third lens.

4. The imaging lens according to claim 1, wherein a conditional expression (13) below is satisfied:

$$0.36 < f12/f34 < 2.47 \quad (13)$$

where
f12: composite focal length of the first and second lenses
f34: composite focal length of the third and fourth lenses.

5. The imaging lens according to claim 1, wherein a conditional expression (14) below is satisfied:

$$1.80 < f/EPD < 2.60 \quad (14)$$

where
EPD: exit pupil diameter.

6. The imaging lens according to claim 1, wherein conditional expressions (7), (8), (9), and (10) below are satisfied:

$$1.50 < Nd1 < 1.59 \quad (7)$$

$$55.0 < vd1 < 57.0 \quad (8)$$

$$1.60 < Nd2 < 1.67 \quad (9)$$

$$23.0 < vd2 < 26.0 \quad (10)$$

where
Nd1: refractive index of the first lens at d-ray
vd1: Abbe number of the first lens at d-dray
Nd2: refractive index of the second lens at d-ray
vd2: Abbe number of the second lens at d-dray.

7. The imaging lens according to claim 6, wherein regarding the refractive indices and Abbe numbers of the first lens and the second lens, conditional expressions (11) and (12) below are satisfied:

$$1.00 < Nd2/Nd1 < 1.10 \quad (11)$$

$$2.1 < vd1/vd2 < 2.5 \quad (12).$$

* * * * *